(12) United States Patent
Laurell et al.

(10) Patent No.: US 10,107,166 B2
(45) Date of Patent: Oct. 23, 2018

(54) CATALYTIC CONVERTER AND EXHAUST-GAS AFTERTREATMENT ARRANGEMENT

(71) Applicant: Volvo Car Corporation, Gothenburg (SE)

(72) Inventors: Mats Laurell, Gothenburg (SE); Jan Dahlgren, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 75 days.

(21) Appl. No.: 15/380,174

(22) Filed: Dec. 15, 2016

(65) Prior Publication Data

US 2017/0184001 A1    Jun. 29, 2017

(30) Foreign Application Priority Data

Dec. 23, 2015 (EP) .................................... 15202306

(51) Int. Cl.
| | |
|---|---|
| F01N 3/00 | (2006.01) |
| F01N 3/28 | (2006.01) |
| F01N 9/00 | (2006.01) |
| F01N 3/08 | (2006.01) |
| F01N 3/10 | (2006.01) |
| F01N 3/18 | (2006.01) |
| F01N 3/20 | (2006.01) |
| F01N 13/00 | (2010.01) |

(52) U.S. Cl.
CPC ......... *F01N 3/2892* (2013.01); *F01N 3/0814* (2013.01); *F01N 3/0835* (2013.01); *F01N 3/101* (2013.01); *F01N 3/105* (2013.01); *F01N 3/18* (2013.01); *F01N 3/20* (2013.01); *F01N 3/2053* (2013.01); *F01N 9/00* (2013.01);
(Continued)

(58) Field of Classification Search
CPC .... F01N 13/009; F01N 3/2006; F01N 3/2046; F01N 3/2053
See application file for complete search history.

(56) References Cited

U.S. PATENT DOCUMENTS

| | | | |
|---|---|---|---|
| 3,937,015 A | 2/1976 | Akado et al. | |
| 5,277,026 A | 1/1994 | Boll et al. | |

(Continued)

FOREIGN PATENT DOCUMENTS

| | | |
|---|---|---|
| EP | 0953738 A2 | 3/1999 |
| EP | 2453113 A1 | 5/2012 |
| EP | 2873821 A1 | 5/2015 |

*Primary Examiner* — Audrey K Bradley
*Assistant Examiner* — Anthony Ayala Delgado
(74) *Attorney, Agent, or Firm* — Snyder, Clark, Lesch & Chung, LLP

(57) ABSTRACT

A catalytic converter for an internal combustion engine includes a tubular member which defines a volume within which a catalytic converter substrate is located, the volume communicates with an inlet portion for receiving exhaust gas emissions and with a first outlet portion for discharging emissions after catalytic conversion. The catalytic converter may also include a pipe member within the tubular member, which connects the inlet portion with the volume and guides emissions from the inlet portion in a first direction. The pipe member opens into a deflector member which deflects emissions into the volume in a second direction, and the catalytic converter includes a second outlet portion connected to the deflector member and a valve to control gas flow through the second outlet portion to guide emissions away from the pipe member and out of the catalytic converter prior to reaching the catalytic converter substrate when the valve is open.

13 Claims, 4 Drawing Sheets

(52) U.S. Cl.
CPC ....... *F01N 13/009* (2014.06); *F01N 13/0093* (2014.06); *F01N 2240/20* (2013.01); *F01N 2240/36* (2013.01); *F01N 2410/00* (2013.01); *F01N 2410/06* (2013.01); *F01N 2470/08* (2013.01); *F01N 2470/14* (2013.01); *F01N 2560/06* (2013.01); *F01N 2560/07* (2013.01); *F01N 2900/1411* (2013.01); *F01N 2900/1602* (2013.01); *F01N 2900/1626* (2013.01); *Y02T 10/22* (2013.01); *Y02T 10/47* (2013.01)

(56) References Cited

U.S. PATENT DOCUMENTS

| | | | | |
|---|---|---|---|---|
| 6,397,586 | B1* | 6/2002 | Sakurai | B01D 53/9495 60/285 |
| 6,444,177 | B1* | 9/2002 | Muller | B01D 53/8631 422/172 |
| 6,680,037 | B1* | 1/2004 | Allansson | F01N 3/0231 422/168 |
| 7,444,803 | B2* | 11/2008 | Iwamoto | F01N 3/0814 60/274 |
| 7,987,935 | B2* | 8/2011 | Ichimoto | B60K 6/365 180/309 |
| 9,376,951 | B2* | 6/2016 | Laurell | F01N 3/10 |
| 2005/0220679 | A1* | 10/2005 | Choi | B01D 53/9454 422/177 |
| 2006/0242947 | A1* | 11/2006 | Kay | B01D 53/9422 60/284 |
| 2010/0263352 | A1* | 10/2010 | Hylands | B01D 53/90 60/273 |
| 2014/0360170 | A1* | 12/2014 | Hacklander | F01N 3/2066 60/286 |

* cited by examiner

CATALYTIC CONVERTER AND EXHAUST-GAS AFTERTREATMENT ARRANGEMENT

Related Application

This application claims priority under 35 U.S.C. § 119 based on European Patent Application No. 15202306.5, filed Dec. 23, 2015, the disclosure of which is hereby incorporated by reference herein.

FIELD OF THE INVENTION

The present invention relates to an exhaust-gas aftertreatment arrangement for improving, particularly during cold start and warming-up, catalytic conversion of exhaust gas emissions from an internal combustion engine. In particular, the invention relates to an exhaust-gas aftertreatment device comprising a catalytic converter.

BACKGROUND OF THE INVENTION

A catalytic converter for a vehicle comprises in general a canned and coated catalytic converter substrate in flow communication with inlet and outlet passages. It is positioned on the exhaust side of the internal combustion engine of the vehicle in order to treat exhaust gas emissions from the engine.

During cold start and warming-up of the engine, the catalytic converter is not sufficiently heated for optimum performance and the exhaust gas emissions may therefore pass through the catalytic converter without catalytic conversion thereof. To improve the heating properties, the catalytic converter is often positioned as close as possible to the exhaust ports. To accelerate heating, it is also possible to heat the catalytic converter electrically or to temporarily control combustion such that the temperature of the exhaust gas heat flow is increased.

A frequent problem also particularly during cold start is that emissions in liquid form exit the engine. This may be caused by liquid fuel and oil which passes the engine during cranking of the engine, prior to combustion. Moreover, during cold start, exhaust gases might condense on cold walls and for liquid fuel and oil.

A solution to one or more of the abovementioned problems used by some manufacturers is a so called hydrocarbon trap. Due to the fact that the catalytic converter substrate is not warm enough for catalytic conversion and that the concentration of hydrocarbon is high during cold start, a hydrocarbon trap where a trap material is coated on a typical catalytic converter substrate may be needed. The trap material stores hydrocarbon at low temperatures and releases hydrocarbon at higher temperatures. The trap material is, however, sensitive to aging.

Moreover, catalytic converters typically need protection to avoid overheating which may otherwise occur at full load operation. Overheating can be avoided by over-fueling but that also causes the catalytic converter to operate at sub-optimal conditions, leading to an increase in tail-pipe emissions.

EP 2453113 provides an improved exhaust-gas aftertreatment device where deflector means are used to collect and retain emissions in liquid form in a cold start phase until the deflector means has been sufficiently heated for the emissions to evaporate.

However, there is still room for improvement of the above exhaust-gas aftertreatment device, in particular with respect to the life length of the catalytic converter material in high performance engines.

SUMMARY

In view of above-mentioned and other drawbacks of the prior art, it is an object of the present invention to provide an improved catalytic converter for an internal combustion engine which helps to reduce emissions and to improve the efficiency of the engine.

According to a first aspect of the invention, there is provided a catalytic converter for an internal combustion engine, comprising: a tubular member which defines a volume within which a first catalytic converter substrate is located, and wherein the volume with the first catalytic converter substrate communicates with an inlet portion for receiving exhaust gas emissions from the internal combustion engine and with a first outlet portion for discharging the exhaust gas emissions after catalytic conversion thereof in the volume, a pipe member within the tubular member of the catalytic converter, which pipe member connects the inlet portion with the volume in the tubular member and guides the exhaust gas emissions from the inlet portion in a first direction of flow, and that the pipe member downstream opens into a deflector member which deflects the exhaust gas emissions into the volume of the tubular member of the catalytic converter in a second direction of flow different from the first direction of flow wherein the catalytic converter further comprises a second outlet portion connected to the deflector member, the second outlet portion comprising a valve configured to control a flow of exhaust gas through the second outlet portion to guide exhaust gas emissions away from the pipe member and out of the catalytic converter prior to reaching the first catalytic converter substrate when the valve is open.

The present invention is based on the realization that an improved catalytic converter can be achieved by providing a second outlet controlled by a valve so that the flow of exhaust gas only passes the catalytic converter substrate during certain operating conditions of the engine. For example, during high performance operation of the engine, the valve is preferably open to allow the exhaust gas to bypass the first catalytic converter substrate, thereby reducing the back pressure experienced by the engine, and thereby reducing the catalyst temperature. Moreover, since the active components of the catalytic converter substrate are aged due to thermal exposure it is advantageous to minimize the amount of exhaust gas being passed through the catalytic converter substrate when it is not required. By opening the valve during high performance operation of the engine, it is also possible to avoid overheating of the catalytic converter which reduces the aging thereby prolonging the life length of the catalytic converter.

Furthermore, by providing the catalytic converter with a pipe member which is located within the tubular member of the catalytic converter and which connects the inlet portion with the volume in the tubular member and which guides the exhaust gas emissions from the inlet portion in a first direction of flow, and by ensuring that the pipe member downstream opens into a deflector member which deflects the exhaust gas emissions into the volume of the tubular member of the catalytic converter in a second direction of flow substantially opposite to said first direction of flow, when the valve is closed, the period of time before the exhaust gas emissions reach the catalytic converter is increased and mixing of the exhaust gas emissions during this period of time is improved.

According to one embodiment of the invention, the valve is preferably closed during a cold start phase of the engine. At the cold start phase of the engine, due in part to incomplete combustion, the emissions in the exhaust gas are typically higher than during normal operation when the engine is warm. Accordingly, by closing the valve during a cold start phase, the exhaust gas is forced through the first catalytic converter substrate, thereby reducing the emissions of the exhaust gas. Once the engine has reached a suitable operating temperature, the valve can be opened to reduce the back pressure as discussed above.

In one embodiment of the invention, the valve may be controlled based on a mass flow of exhaust gas from the engine. When the engine is operating in a high-performance mode, i.e. at high rpm, the mass flow of the exhaust gas is likewise high. In order to maximize the performance of the engine, and at the same time reduce the thermal load of the catalytic converter, it is desirable to reduce the back pressure from the catalytic converter which is achieved by opening the valve and allowing exhaust gas to flow unhindered via the second outlet.

According to one embodiment of the invention, the valve may advantageously be an on/off valve which provides a simple way of operating the valve without the need for control mechanisms for determining a degree of opening. Thus, the valve is either fully open or fully closed. However, the skilled person readily realizes that a variable valve may equally well be used to the same effect.

According to one embodiment of the invention, the deflector member of the catalytic converter may further be configured to collect emissions in liquid form and to retain the emissions until the deflector means has been heated such that the emissions evaporate into gaseous form, wherein the deflector member, on the side wall thereof facing the flow of exhaust gas emissions, is at least partly provided with a layer of porous material to absorb emissions in liquid or particulate form.

That the deflector means of said device is configured such that it can collect emissions in liquid form in the exhaust gas emissions and retain these emissions in liquid form until the operating temperature of the device and, of course, of the catalytic converter is such that said emissions in liquid form evaporate into gaseous form will further increase the dwell time of the exhaust gas emissions in the device to ensure that the emissions in liquid form therein are adequately transformed into gaseous form and consequently improve mixing thereof before performing the catalytic conversion, and thereby further improve the performance of the catalytic converter.

According to one embodiment of the invention, there is provided an exhaust-gas aftertreatment arrangement comprising a first catalytic converter according to any one of the embodiments described above, wherein the first catalytic converter is a close coupled converter arranged adjacent to an exhaust manifold of the engine; and second catalytic converter arranged in series with and after said first catalytic converter, wherein the valve is controlled based on a temperature of a second catalytic converter substrate of said second catalytic converter.

That the first catalytic converter is a so called close coupled catalytic converter (CCC) arranged as close as possible to the exhaust manifold of the engine has the effect that it is heated faster than a catalytic converter for example arranged under the floor of the vehicle, i.e. an under floor converter (UFC). Moreover, it is known that the catalytic process taking place at the catalytic converter substrate is most efficient at an elevated temperature, and that the degree of emissions therefore may be higher during a cold start phase of the engine. The close coupled converter heats up quickly, due to its exposure to the very hot exhaust gases directly from the engine, enabling it to reduce undesirable emissions during the engine warm-up period. This is achieved by burning off the excess hydrocarbons which result from the extra-rich mixture required for a cold start.

According to one embodiment of the invention, the valve may be controlled based on a temperature of the second catalytic converter substrate. Thereby, the use of a close coupled converter in combination with an underfloor converter, along with a valve controlling the flow through the first catalytic converter, enables a selection so that the close coupled converter can be used only when desired. The close coupled converter can be used during a cold start phase until the catalytic substrate of the second converter has reached a sufficiently high temperature so that the exhaust gas is passed through both the first and the second catalytic converter during a cold start phase. After the operating temperature of the second catalytic converter has been reached, the valve can be opened so that the exhaust gas bypasses the first catalytic converter substrate, thus being directly lead to the second catalytic converter. Thereby, undesirable back pressure can be avoided which in turn improves the fuel efficiency and decreases the tailpipe emissions of the engine.

In one embodiment of the invention, the valve may be configured to be closed if a temperature of the second catalytic converter substrate is below a predetermined threshold value, the second predetermined threshold value being in the range of 300 to 400° C. In particular, the predetermined temperature threshold value may be approximately 350° C. The threshold value is based on the efficiency of the catalytic converter substrate at different temperatures and may be set according to the specific catalyst used and according to specific requirements with regards to exhaust emission levels. Thereby, the first catalytic converter can be activated if operating temperature of the second catalytic converter becomes too low.

According to a second aspect of the invention, there is provided a method for controlling an exhaust-gas aftertreatment arrangement comprising: a first catalytic converter comprising: a tubular member which defines a volume within which a catalytic converter substrate is located, and wherein the volume with the catalytic converter substrate communicates with an inlet portion for receiving exhaust gas emissions from the internal combustion engine and with a first outlet portion for discharging the exhaust gas emissions after catalytic conversion thereof in the volume, a pipe member within the tubular member of the catalytic converter, which pipe member connects the inlet portion with the volume in the tubular member and guides the exhaust gas emissions from the inlet portion in a first direction of flow, and that the pipe member downstream opens into a deflector member which deflects the exhaust gas emissions into the volume of the tubular member of the catalytic converter in a second direction of flow different from the first direction of flow, wherein the catalytic converter further comprises a second outlet portion connected to the deflector member configured to guide exhaust gas emissions away from the pipe member and out of the catalytic converter prior to reaching the catalytic converter substrate, the second outlet portion comprising a valve configured to control a flow of exhaust gas through the second outlet portion; the first catalytic converter being a close coupled converter arranged adjacent to an exhaust manifold of the engine; and a second catalytic converter arranged in series with and after the first catalytic converter and comprising an inlet connected to the first and second outlet of the first catalytic converter; the second catalytic converter further comprising a second catalytic converter substrate; the method comprising: determining a temperature of the second catalytic converter substrate; if the temperature is below a predetermined temperature threshold value, close the valve.

The predetermined temperature threshold value may preferably be in the range of 300° C. to 400° C., and more preferably the predetermined temperature threshold value may be approximately 350° C.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a catalytic converter in an exhaust-gas aftertreatment arrangement for a combustion engine.

Figure 1:
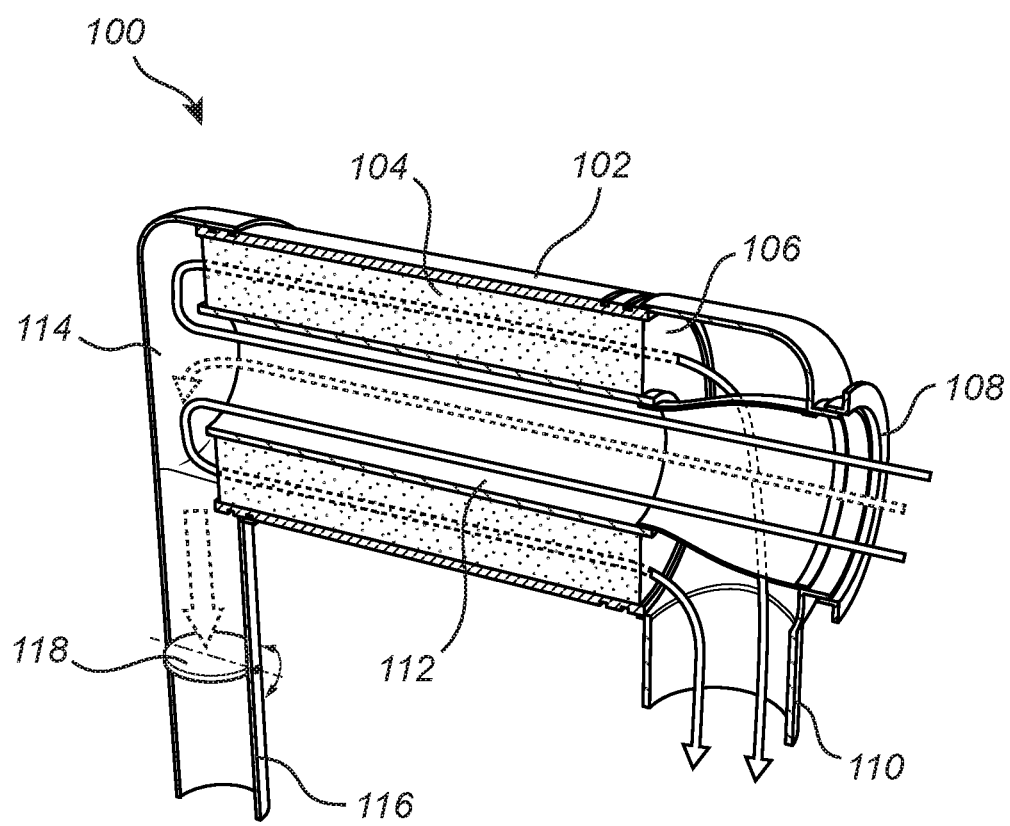
FIG. 1 schematically illustrates a catalytic converter according to an embodiment of the invention.

FIG. 1 schematically illustrates a catalytic converter 100. The catalytic converter 100 comprises a tubular member 102 which defines a volume 104 within which a first catalytic converter substrate 106 is located. The volume 104 with the first catalytic converter substrate 106 communicates with an inlet portion 108 for receiving an exhaust gas flow from the exhaust manifold of an internal combustion engine. A catalytic converter which is arranged directly adjacent to the exhaust manifold of a combustion engine is often referred to as a close coupled catalytic converter (CCC). The catalytic converter 100 further comprises a first outlet portion 110 for discharging the exhaust gas flow after catalytic conversion thereof in the volume 104. A tubular pipe member 112 within the tubular member 102 of the catalytic converter 100 connects the inlet portion 108 with the volume 104 in the tubular member 102 and guides the exhaust gas from the inlet portion 108 in a first direction of flow, in FIG. 1 illustrated from left to right, i.e. from the inlet 108 and through the pipe member 112. The downstream portion of the pipe member 112, opposite the inlet 108, opens into a deflector member 114 which deflects the exhaust gas into the volume 104 of the tubular member 102 of the catalytic converter 102 in a second direction of flow different from the first direction of flow. Here, the second direction of flow is opposite the first direction of flow. The catalytic converter 100 further comprises a second outlet portion 116 connected to the deflector member 114, the second outlet portion 116 comprising a valve 118 configured to control a flow of exhaust gas through the second outlet portion 116 to guide exhaust gas emissions away from the pipe member 112 and out of the catalytic converter 100 prior to reaching the first catalytic converter substrate 106 when the valve 118 is open. Thereby, the valve 118 controls if the exhaust flow from the combustion engine passes through the first catalytic converter substrate 106 or not. The valve 118 can for example be an on/off valve which is controlled based on a measured parameter value or on a mode of operation of the combustion engine. The valve 118 may also be a variable valve controlled based on the above parameters. Moreover, it is desirable that the valve 118 is closed during a cold start phase of the engine where the emissions are typically higher and when it is more important that the exhaust gas passes through the catalytic converter substrate 106.

Figure 2A:
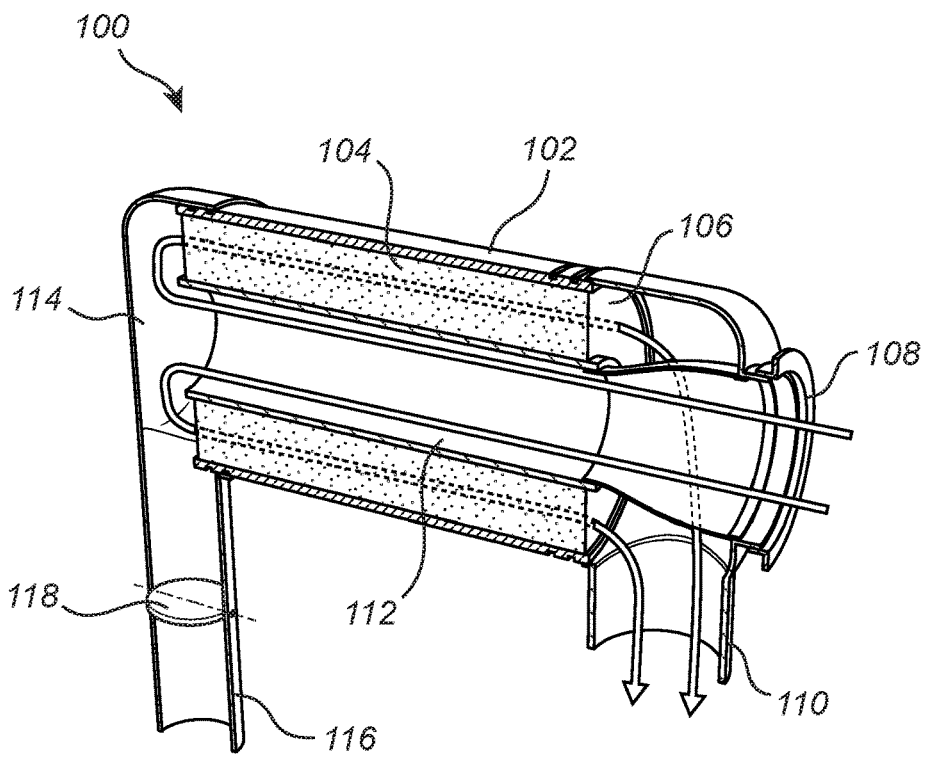
FIGS. 2A-2B schematically illustrate catalytic converters according to embodiments of the invention.

FIG. 2A illustrates the catalytic converter 100 when the valve 118 is closed. Here it can be seen that the flow of exhaust gas is redirected by the deflector member 114 to flow through the volume 104 where the first catalytic converter substrate 106 is located and further through the first outlet 110, thus passing through the catalytic converter substrate 106.

Figure 2B:
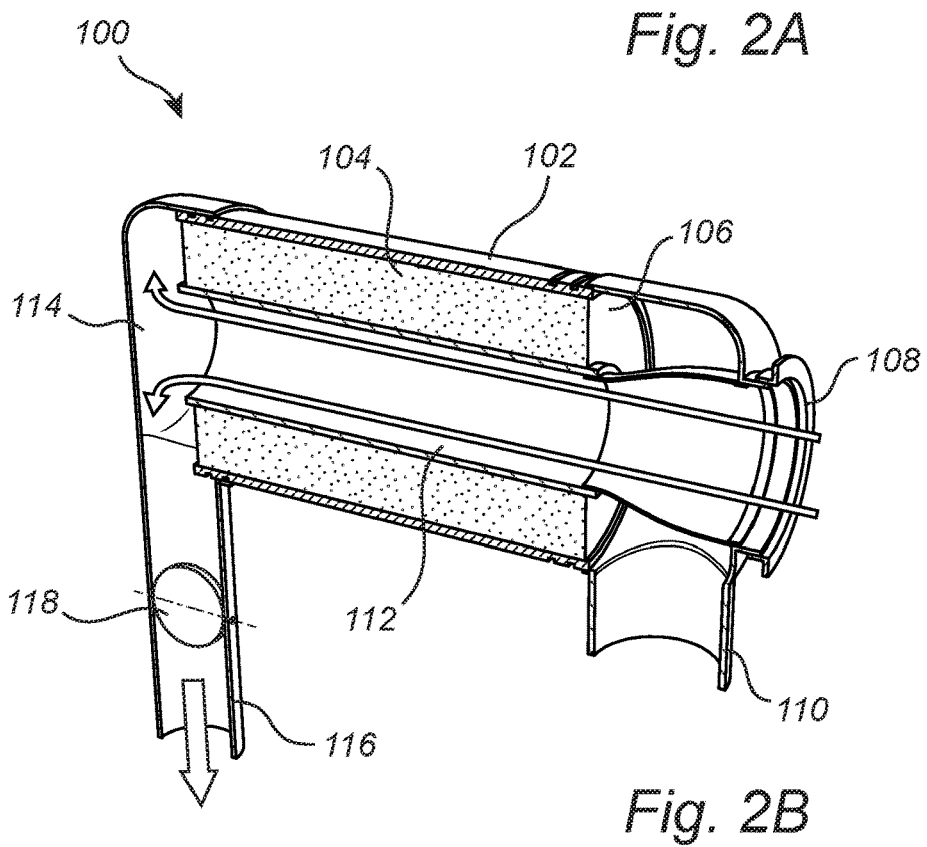

FIG. 2B illustrates the catalytic converter 100 when the valve 118 is open and when the exhaust gas flow directly out through the second outlet 116 without passing the volume 104 where the first catalytic converter substrate 106 is located.

Figure 3:
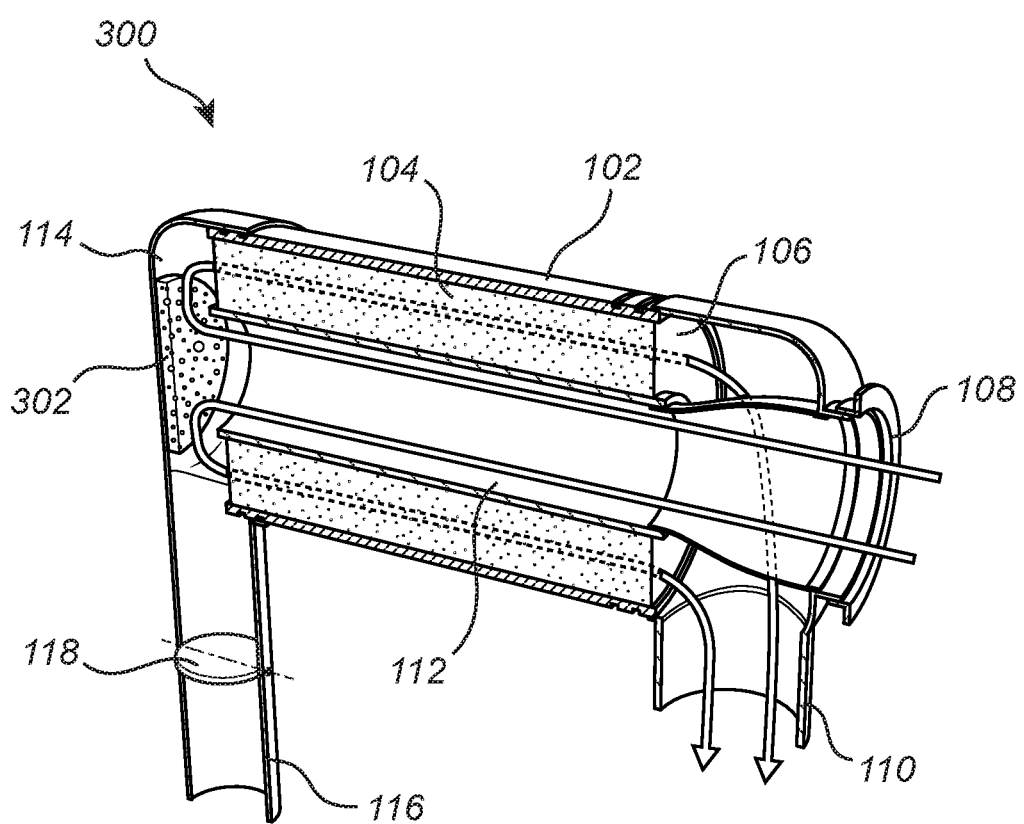
FIG. 3 schematically illustrates a catalytic converter according to an embodiment of the invention.

FIG. 3 schematically illustrates a catalytic converter 300 where the deflector member 114 is configured to collect emissions in liquid form and to retain the emissions until the deflector member 114 has been heated such that the emissions evaporate into gaseous form. To achieve this, the deflector member 114 is at least partly provided with a layer 302 of porous material to absorb emissions in liquid or particulate form. The layer 302 of porous material is here arranged on the side wall of the deflector member 114 facing the flow of exhaust gas emissions from the pipe 112 so that the exhaust gas is guided directly towards the porous material by the pipe 112.

Figure 4:
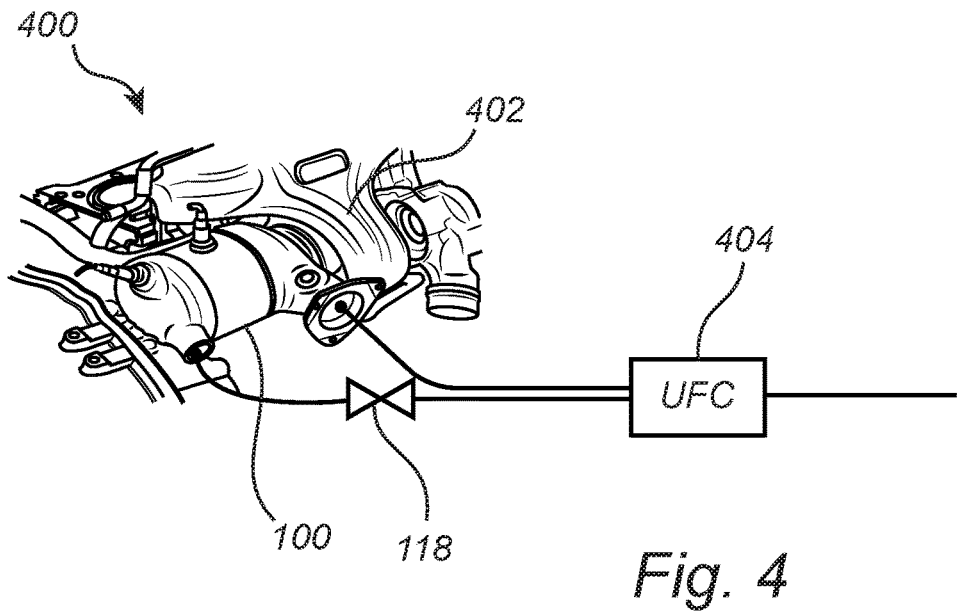
FIG. 4 schematically illustrates an exhaust-gas aftertreatment arrangement according to an embodiment of the invention.

FIG. 4 illustrates an exhaust-gas aftertreatment arrangement 400 comprising a first catalytic converter 100 according to any one of the embodiments described above. The first catalytic converter is a close coupled converter arranged adjacent to an exhaust manifold 402 of a combustion engine. The aftertreatment arrangement 400 further comprises a second catalytic converter 404 arranged in series with and after the first catalytic converter. The second catalytic converter 404 is an underfloor converter (UFC) located downstream of and at a distance from the first catalytic converter 100. The second catalytic converter 404 has an inlet which is connected to each of the first outlet 116 and the second outlet 110 of the first catalytic converter 100. The second catalytic converter 404 thus receives the flow of exhaust gas from the first catalytic converter 100 regardless of the position of the valve 118. Furthermore, in an embodiment of the invention, the valve 118 is controlled based on a temperature of a second catalytic converter substrate (not shown) of the second catalytic converter 404. Thereby, the above described exhaust-gas aftertreatment arrangement 400 can ensure that the exhaust gas from the engine passes through the catalytic converter substrate 106 of the first catalytic converter 100 until the catalytic converter substrate of the second catalytic converter 404 has reached an acceptable operating temperature, thereby reducing the overall amount of emissions from the aftertreatment arrangement. The acceptable operating temperature can typically be in the range of 300 to 400° C., for example 350° C. However, the operating temperature may be different for different types of catalytic converters.

Figure 5:
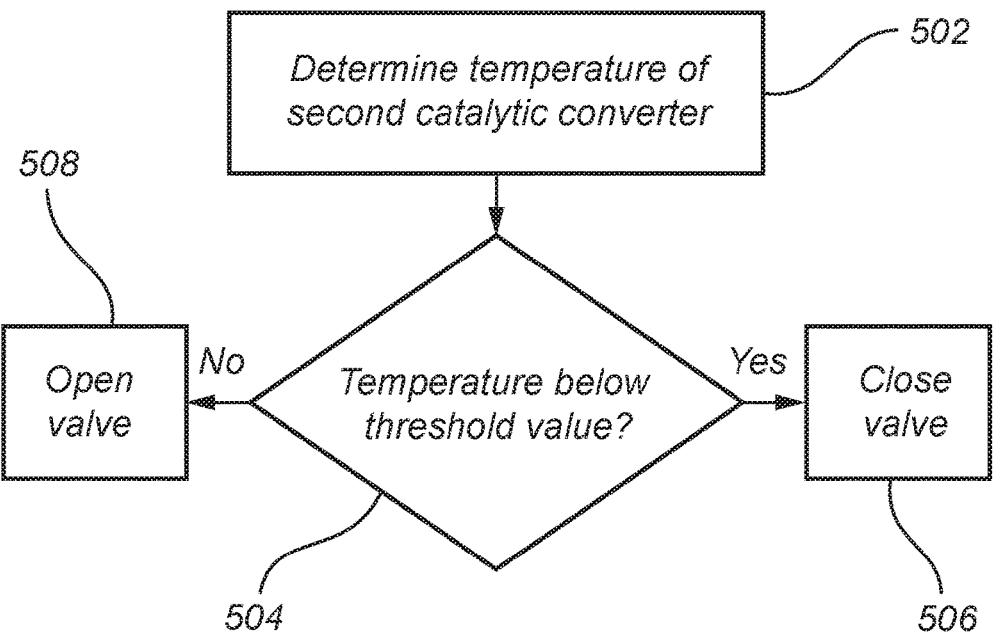
FIG. 5 is a flow chart outlining the general steps of a method according to an embodiment of the invention.

FIG. 5 is a flow chart outlining the general functionality of the exhaust-gas aftertreatment arrangement 400 illustrated in FIG. 4. In a first step 502, the temperature of the second catalytic converter 404 is determined. For example, the operating temperature of the second catalytic converter 404 may be monitored continuously by a vehicle control system. Thereafter, the temperature is compared 504 to a threshold value, such as 350° C., and if the measured temperature is below the threshold value, the valve 118 is closed 506. If the measured temperature is above the threshold value, the valve 118 is opened 508. In practice the temperature value can be seen as the trigger determining opening and closing of the valve.

The exhaust-gas aftertreatment arrangement 400 is here illustrated as comprising one UFC 404. However, it is equally possible to use two or more UFCs arranged in parallel after the first catalytic converter 100 for example in order to increase the effective area of catalytic conversion.

Even though the invention has been described with reference to specific exemplifying embodiments thereof, many different alterations, modifications and the like will become apparent for those skilled in the art. Also, it should be noted that parts of the device may be omitted, interchanged or arranged in various ways, the device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A catalytic converter for an internal combustion engine, comprising:
a tubular member which defines a volume within which a first catalytic converter substrate is located, and wherein the volume with the first catalytic converter substrate communicates with an inlet portion for receiving exhaust gas emissions from the internal combustion engine and with a first outlet portion for discharging said exhaust gas emissions after catalytic conversion thereof in said volume,
a pipe member within said tubular member of said first catalytic converter, which pipe member connects the inlet portion with the volume in said tubular member and guides the exhaust gas emissions from said inlet portion in a first direction of flow, and that said pipe member downstream opens into a deflector member which deflects the exhaust gas emissions into the volume of the tubular member of the catalytic converter in a second direction of flow different from said first direction of flow,
wherein said catalytic converter further comprises a second outlet portion connected to said deflector member, said second outlet portion comprising a valve configured to control a flow of exhaust gas through said second outlet portion to guide exhaust gas emissions away from said pipe member and out of said catalytic converter prior to reaching said first catalytic converter substrate when said valve is open.

2. The catalytic converter according to claim 1, wherein said valve is configured to be closed during a cold start phase of said engine.

3. The catalytic converter according to claim 1, wherein said valve is configured to be closed for at least 30 seconds after a cold start of said engine.

4. The catalytic converter according to claim 1, wherein said valve is configured to be controlled based on a mass flow of exhaust gas from said engine.

5. The catalytic converter according to claim 1, wherein said valve is an on/off valve.

6. The catalytic converter according to claim 1, wherein the deflector member is configured to collect emissions in liquid form and to retain said emissions until said deflector member has been heated such that said emissions evaporate into gaseous form, wherein the deflector member, on the side wall thereof facing the flow of exhaust gas emissions, is at least partly provided with a layer of porous material to absorb emissions in liquid or particulate form.

7. An exhaust-gas aftertreatment arrangement comprising:
a first catalytic converter according to claim 1, said first catalytic converter being a close coupled converter arranged adjacent to an exhaust manifold of said engine; and
a second catalytic converter arranged in series with and after said first catalytic converter, said second catalytic converter having an inlet connected to each of said first outlet and said second outlet, wherein said valve is configured to be controlled based on a temperature of a second catalytic converter substrate of said second catalytic converter.

8. The arrangement according to claim 7, wherein said valve is configured to be controlled based on a temperature of said second catalytic converter substrate.

9. The arrangement according to claim 8, wherein said valve is configured to be closed if a temperature of said second catalytic converter substrate is below a predetermined threshold value, said predetermined threshold value being in the range of 300 to 400° C.

10. The arrangement according to claim 9, wherein said predetermined threshold value is approximately 350° C.

11. A method for controlling an exhaust-gas aftertreatment arrangement comprising:
a first catalytic converter comprising:
a tubular member which defines a volume within which a catalytic converter substrate is located, and wherein the volume with the catalytic converter substrate communicates with an inlet portion for receiving exhaust gas emissions from an internal combustion engine and with a first outlet portion for discharging said exhaust gas emissions after catalytic conversion thereof in said volume,
a pipe member within said tubular member of said first catalytic converter, which pipe member connects the inlet portion with the volume in said tubular member and guides the exhaust gas emissions from said inlet portion in a first direction of flow, and that said pipe member downstream opens into a deflector member which deflects the exhaust gas emissions into the volume of the tubular member of the catalytic converter in a second direction of flow different from said first direction of flow, wherein said catalytic converter further comprises a second outlet portion connected to said deflector member, said second outlet portion comprising a valve configured to control a flow of exhaust gas through said second outlet portion to guide exhaust gas emissions away from said pipe member and out of said catalytic converter prior to reaching said first catalytic converter substrate when said valve is open;

said first catalytic converter being a close coupled converter arranged adjacent to an exhaust manifold of said engine; and a second catalytic converter arranged in series with and after said first catalytic converter and comprising an inlet connected to said first and second outlet of said first catalytic converter, said second catalytic converter comprising a second catalytic converter substrate;

said method comprising:

determining a temperature of said second catalytic converter substrate;

if said temperature is below a predetermined temperature threshold value, close said valve; and if said temperature is above said predetermined temperature threshold value, open said valve.

12. The method according to claim 11, wherein said predetermined temperature threshold value is in the range of 300° C. to 400° C.

13. The method according to claim 12, wherein said predetermined temperature threshold value is approximately 350° C.

* * * * *